(12) United States Patent
Gatesman

(10) Patent No.: US 7,110,390 B1
(45) Date of Patent: Sep. 19, 2006

(54) COMMUNICATION CONTROLLER FOR PROVIDING MULTIPLE ACCESS USING A SINGLE TELEPHONE LINE

(75) Inventor: Kevin Gatesman, Fairfax, VA (US)

(73) Assignee: MCI, Inc., Ashburn, VA (US)

( * ) Notice: Subject to any disclaimer, the term of this patent is extended or adjusted under 35 U.S.C. 154(b) by 546 days.

(21) Appl. No.: 09/294,475

(22) Filed: Apr. 20, 1999

(51) Int. Cl.
  *H04L 12/66* (2006.01)
  *H04L 12/28* (2006.01)
(52) U.S. Cl. .................... 370/352; 370/401; 370/466
(58) Field of Classification Search ........ 370/351–356, 370/400–402, 473–466; 379/88.17, 900, 379/215.01; 709/265
  See application file for complete search history.

(56) References Cited

U.S. PATENT DOCUMENTS

| | | | | |
|---|---|---|---|---|
| 5,793,763 A | * | 8/1998 | Mayes et al. ............... | 370/401 |
| 5,946,384 A | * | 8/1999 | Yee et al. ............... | 379/215.01 |
| 6,028,848 A | | 2/2000 | Bhatia et al. | |
| 6,058,431 A | * | 5/2000 | Srisuresh et al. ........... | 709/245 |
| 6,067,353 A | * | 5/2000 | Szeliga ................... | 379/215.01 |
| 6,108,330 A | * | 8/2000 | Bhatia et al. ............... | 370/352 |
| 6,295,293 B1 | * | 9/2001 | Tonnby et al. ............... | 370/351 |
| 6,320,857 B1 | * | 11/2001 | Tonnby et al. ............... | 370/352 |
| 6,353,614 B1 | * | 3/2002 | Borella et al. ............... | 370/401 |
| 6,385,194 B1 | * | 5/2002 | Surprenant et al. ......... | 370/353 |
| 6,449,251 B1 | * | 9/2002 | Awadallah et al. ......... | 370/465 |
| 6,452,923 B1 | * | 9/2002 | Gerszberg et al. .......... | 370/352 |
| 6,456,625 B1 | * | 9/2002 | Itoi ............................. | 370/401 |
| 6,515,996 B1 | * | 2/2003 | Tonnby ..................... | 370/352 |

FOREIGN PATENT DOCUMENTS

| | | | |
|---|---|---|---|
| WO | 97/46073 | * | 12/1997 |
| WO | 97/47127 | * | 12/1997 |
| WO | 98/37665 | | 8/1998 |

OTHER PUBLICATIONS

Hansson et al., "Phone Doubler—A Step Towards Integrated Internet and Telephone Communities", On—Ericsson Review, Ericsson, Stockholm, SE, No. 4, 1997, pp. 142-151.

* cited by examiner

*Primary Examiner*—Steven Nguyen

(57) ABSTRACT

Instead of having to subscribe to multiple telephone lines for multiple devices that a user has, a module of the present invention can connect each of the user's devices to an outside communications network using the same telephone line. Such multiple inside connections to the outside communication network using the same telephone line is achieved by provisioning within the invention module the appropriate telephone and computer interface units for the user's telephones and computers, and an appropriate network interface unit for connection to the telephone line that connects the invention module to the external communications network. The module of the instant invention is further provisioned with an IP routing submodule that communicatively connects the various interface units together by managing the addressing of the data that traverses between the outside network and the devices of the user, by routing the appropriate data packets to the appropriate devices by means of pseudo internal IP addresses assigned to the various devices of the user. Other components within the module convert those data packets that are a part of a voice signal into the appropriate analog signal for output to the telephone of the user. Conversely, such components convert any analog input from the user into a corresponding digital signal that is packetized and output to the external communications network.

29 Claims, 6 Drawing Sheets

COMMUNICATION CONTROLLER FOR PROVIDING MULTIPLE ACCESS USING A SINGLE TELEPHONE LINE

FIELD OF THE INVENTION

The present invention relates to telephony and more particularly to the simultaneous accessing of voice and data signals using a Single Telephone Line, Digital Subscriber Line, ISDN, Cable or Wireless Access Loop.

BACKGROUND OF THE INVENTION

In a home or small office environment, a person that needs to have access to both voice and data communications needs to have two telephone lines, if he or she wants to simultaneously communicate via voice to another person and be connected to a data communications network. Before the instant invention, if a person were to attempt to communicate with another person by voice by using his or her computer, then he or she could not at the same time communicate with another data or voice source since the telephone line that provides access to his or her computer could only gain access to one particular address in the internet network. Moreover, any voice communication via computers tends not to be as clear as a conventional telephone call between two users. There is, therefore, no good alternative of foregoing the need for two separate telephone lines if a user needs both voice and data communication at the same time.

BRIEF DESCRIPTION OF THE PRESENT INVENTION

The present invention is a device that enables a person with a computer and a telephone to use his telephone in a standard fashion while at the same time use the same telephone line for connecting his computer to the internet. The upshot is that the user is given the ability to potentially receive as well as originate telephone calls transparently while he is using the same telephone line for data connection to a communications network.

In particular, the present invention device could be a stand alone module or a card that is insertable into one of the available data slots or buses in a computer such as for example a personal computer. The inventive module includes a network access interface that enables it to connect to the public switch telephone network (PSTN) by means of either plain old telephone service (POTS), an integrated services digital network (ISDN), a digital subscriber line (DSL), or other types of access connection. In the back end of the module which communicates with the user, there is a telephone interface, which is connectable to any type of telephones, such as for example an analog telephone or an ISDN telephone, as well as any fax machine. There is moreover a data interface at the back end of the module for connection to a computer. This data interface is usable with all types of connections including Ethernet, USB and RJ-45 connections.

The invention module enables a user to use his telephone in a conventional way even while he is connected to the internet from his computer. This is achieved by the use of a processor that is provisioned with a domain host name conversion protocol/network address translation (DHCP/NAT) program or module, and a data packet priority module or program to allow the processor to prioritize the data packets to allow a voice signal to have a higher priority than a data signal. The processor further includes an internal protocol (IP) routing module or program that allows the signal, be it voice or data, to be routed to the appropriate device address.

To enable a user to transparently use his telephone, the inventive module has a voice function portion that includes a ring generator, a dual tone multi-frequency (DTMF) decoder, and a dial tone generator. These components enable the module to provide to the user the same inputs he would have had were his telephone connected directly to the PSTN.

Insofar as the voice signal to/from the user is analog while the data signal to/from the communications network is digital, an analog/digital converter that can bidirectionally convert a digital signal into an analog signal and vice versa is also provided. Connected to the analog/digital converter is a voice over IP gateway (VoIP), whose function is to enable the inter-exchange of the voice signal of the user with the digital signal of the processor. Insofar as the data interface is provisioned to communicate with the user's computer digitally, it can be directly connected to the inventive module.

The processor of the inventive module is connected to the network access interface at its front end. Since whatever signal that is to be received by or transmitted from the processor of the inventive module at the back end of the module is digital, the communication that goes out between the processor and the communications network via the network access interface of the module is digital. By appropriately routing the digital signals, be they packetized voice or data, and utilizing efficiently the available bandwidth of the telephone line, the inventive module is able to provide both analog and digital communications to the user.

As a fail safe to ensure that the user can use his telephone even if the inventive module becomes inoperational, a direct connection is provided between the back end telephone interface and the front end access interface of the invention module so that even if the invention module fails, or not turned on, the user can nonetheless dial out or receive calls as is done conventionally.

An objective of the present invention is therefore to enable a user to both talk on the telephone and log onto the communications network simultaneously while using only one single telephone line. As used, single telephone line may also refer to Digital Subscriber Line, ISDN, Cable or Wireless Access Loop as understood by the skilled artisan.

It is moreover an objective of the present invention to reduce the need for multiple telephone lines to therefore effect call savings for the user.

BRIEF DESCRIPTION OF THE FIGURES

The above mentioned objectives and advantages of the present invention will become apparent and the invention itself will be best understood by reference to the following description of an embodiment of the invention taken in conjunction with the accompanying drawings, wherein.

DETAILED DESCRIPTION OF THE INVENTION

Figure 1:
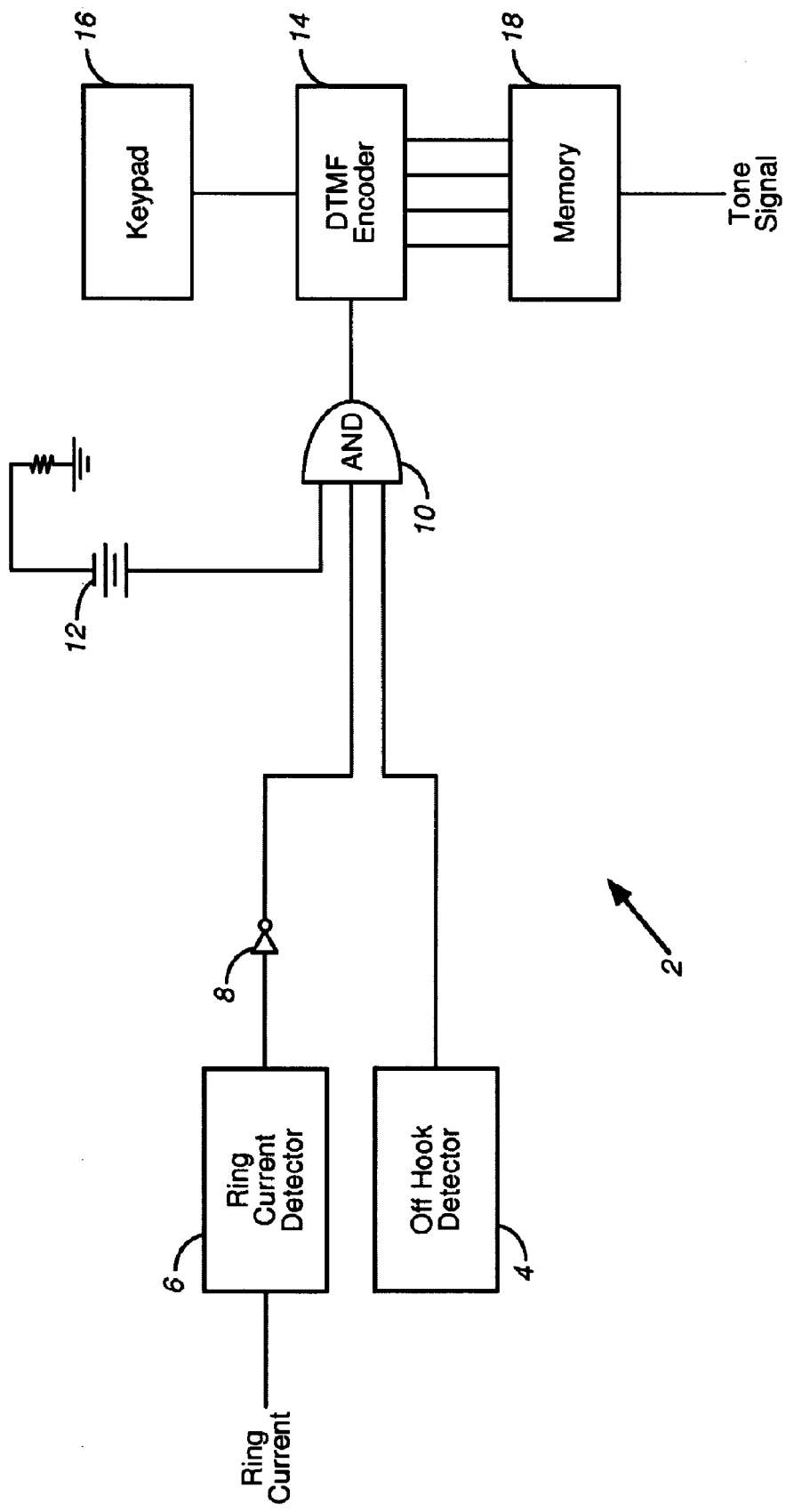
FIG. 1 is a functional and operational diagram illustrating the various components of the instant invention.

With reference to FIG. 1, the module of the instant invention, designated 2, could be a stand alone module or a module that is in the form of an integrated circuit (IC) card that is insertable into any one of the available data buses, such as for example the ISA and PCI buses, in the motherboard of a conventional PC. In fact, module 2 of the instant invention may be configured to be like that of an internal modem board that goes into an available ISA or PCI slot in a motherboard of a PC. Conversely, module 2 could be a stand alone module that could emulate an external modem placed next to a PC and connected thereto by means of either its parallel port, serial port, or its universal serial bus (USB) port.

Shown connected to the user's, or the backside, of module 2 are a number of devices such as a conventional analog telephone 4, an ISDN telephone 6, or a fax machine 8. Although the embodiment of module 2 illustrated in FIG. 1 is shown to have one telephone interface module 10 that interconnects to any one of devices 4, 6 or 8, in practice, module 2 can be configured to have a multiple number of telephone interfacing units so that a number of external devices, such as for example different telephones and fax machines, may all be connected to the same module 2. In any event, it should be noted that each of devices 4–8 is connected to telephone interface unit 10 by either an analog POTS connection, an ISDN TA interface connection, or a RJ-11 interface connection.

Also shown to be connected to module 2, via a data interface unit 12, is a PC 14. The interconnection between PC 14 and data interface unit 12 can be done by an Ethernet connection, a USB connection, a RJ-45 connection, or other types of well known interfacing. As with the voice type devices 4–8, module 2 can be configured such that, the bandwidth of the telephone line permitting, a number of PCs may be connected thereto.

On the front end of module 2 there is a network access interface unit 16 that enables module 2 to be interconnected to communications networks such as for example the PSTN 18 and, by way of appropriate gateways, internet protocol (IP) network 22, also known conventionally as the internet. The gateways that interconnect PSTN 18 to IP network 22 could include a data gateway 20, a voice gateway 24 and a fax gateway 26.

As shown in FIG. 1, module 2 includes a number of components, some of which could be thought of as providing the voice functionality of the module for communicating with devices such as telephones 4, 6 and fax machine 8. These components include a ring generator 28, a DTMF decoder 30, and a dial tone generator 32, all connected to telephone interface unit 10. Ring generator 28, as its name implies, generates rings to the telephone that is connected to telephone interface unit 10. It in essence replaces the signal that usually comes directly from PSTN 18. DTMF decoder 30, on the other hand, provides the device with the functionality of being able to decipher the pulses input by the user for addressing the call. By incorporating the DTMF decoder 30 therewithin, module 2 in essence acts as a middleman for routing any call to its appropriate address at PSTN 18. Dial tone generator 32 is provided within module 2 so that, when there is a data connection between module 2 and PSTN 18 and the user wants to use the telephone, a conventional dial tone is generated thereby for the telephone so that module 2 becomes transparent to the user. Putting it simply, even when the telephone line is being used for connection to the internet, a user could nonetheless pick up his phone, listen for the dial tone, and dial out.

The voice functionality portion of module 2 further includes an analog/digital converter 34 and a voice over IP gateway 36. Voice over IP gateway 36 is a conventional device made by a number of companies such as for example the Cisco Company. What voice over IP gateway 36 does is it can packetize digital signals into data packets and de-packetize data packets into a stream of digital data. Analog/digital converter 34, in the meanwhile, would convert the analog voice signals from the telephone into digital signals for packetizing by voice over IP gateway 36. Conversely, analog/digital converter 34 would convert incoming digital signals from voice over IP gateway 36 into analog voice signals, which are fed to the telephone devices 4–8 by way of telephone interface unit 10.

Voice over IP gateway 36 is connected to IP routing means comprising a processor 38 within module 2. Processor 38 is deemed to comprise a number of submodules including a dynamic host conversion protocol/network address translation (DHCP/NAT) submodule, a packet priority submodule and an IP routing submodule. These submodules may be either hardware modules or subroutines preprogrammed to processor 38. In brief, the DHCP/NAT submodule provides dynamic address assignments for connecting to the Internet so that, as far as the internet is concerned, module 2 looks like any other PC connection. This is important insofar as ordinarily if a device is connected to a communications network, a particular address is assigned to that device. And since there is only one address assigned to a given device, prior to the instant invention, only one type of communication is deemed possible at any one time via that device.

For the instant invention, processor 38, by means of its DHCP/NAT functionality, is able to assign a number of addresses to the user side of module 2, so that the external device that is connected to telephone interface unit 10 can have an address that is different from that of the external device that is connected to module 2 by way of data interface unit 12. Of course, depending on the bandwidth of the communications line to which module 2 is connected to the communications network, a multiple number of devices, each with its own pseudo address assigned by processor 38, could be connected to module 2, via a number of additional interface units not shown in the embodiment of module 2 in FIG. 1. By thus assigning multiple internal addresses at the user's side of module 2, at least two devices being utilized by the user can communicate with the communications network using the same communications connection line, be it a POTS line, an ISDN voice or data line, a DSL data line or cable modem. Note that processor 38 is shown to be connected to data interface unit 12 and voice over IP gateway 36 on its one side, and to network access interface unit 16 on its other side.

Network access interface unit 16 could be in the form of a modem such as for example a V.90 modem, a DSL modem, a cable modem, or other kinds of conventional modem available in the market. Connected to network access interface unit 16 is a call forwarding management functioning unit 40 and a DTMF generator 42. Call forwarding management function unit 40 manages the calls being output from network access interface unit 16 to PSTN 18 and IP network 22. DTMF generator 42 is used for converting the DTMF tones received from the telephone from DTMF decoder 30 into the appropriate tones so as to route the call made by the user to the appropriate address at PSTN 18. Further shown to be included in module 2 is a power supply 44 that provides power to the various components of the module and a message wait indicator 46 that provides an indication, visual or otherwise, to the user that there is at least one message waiting. Such message waiting could be stored in a voice mail server 48 that is part of the internet network 22. The store voice messages are similar to the emails stored in the server of the internet service provider (ISP) of the user.

Given that in most instances a voice conversation takes precedence over data communication, processor 38 has further provisioned therein a packet priority submodule for prioritizing the packets that are traversing between module 2 and the communications network. Thus, when there are simultaneous voice and data communications, a higher priority is given to the voice communication so that the data packets that are a part of the voice message communication are given a higher priority than those data packets that are a part of the data communication. The IP routing functionality provided in processor 38 routes data packets between network access interface unit 16 and either of voice over IP gateway 36 or data interface unit 12.

With reference to FIGS. 2–7, the various scenarios whereby module 2 of the present invention functions are given hereinbelow.

Figure 2:
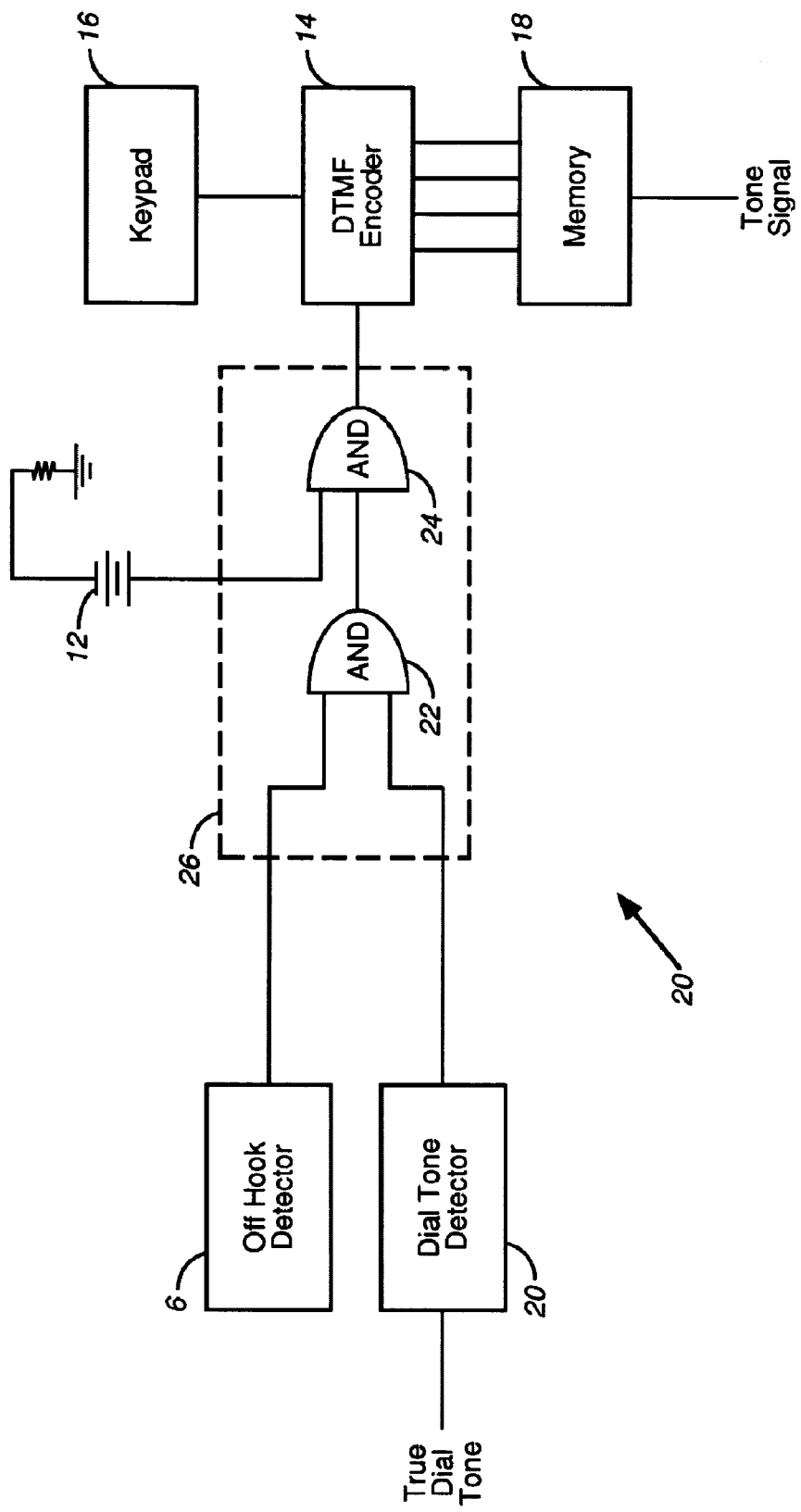
FIG. 2 is a flow chart illustrating the operation of the inventive module whereby a user initiates a telephone call when there is no connection between his computer and the communications network.

The flow chart of FIG. 2 illustrates the scenario whereby a user initiates a call when there is no data connection between module 2 and PSTN 18. To elaborate, the user goes off hook at step 50. In response to the off hook signal, dial tone generator 32 of invention module 2 generates dial tone-step 52. Upon hearing the dial tone, the user acts as if module 2 is transparent and sends his destination address by pressing the appropriate keys on the keypad of this telephone to generate the desired DTMF signal, per step 54. In receipt of the DTMF signal, module 2 makes a determination on whether there is data connection between it and PSTN 18. Since none is detected, the DTMF signal is sent to PSTN 18 per step 56. The call by the user is thereafter established per step 58. Note that for this scenario, module 2 does not even need to be powered on, as there is a life line or patch through 60 that interconnects telephone interface unit 10 with network access interface unit 16 so that a call could be directly routed between the user and PSTN 18.

Figure 3:
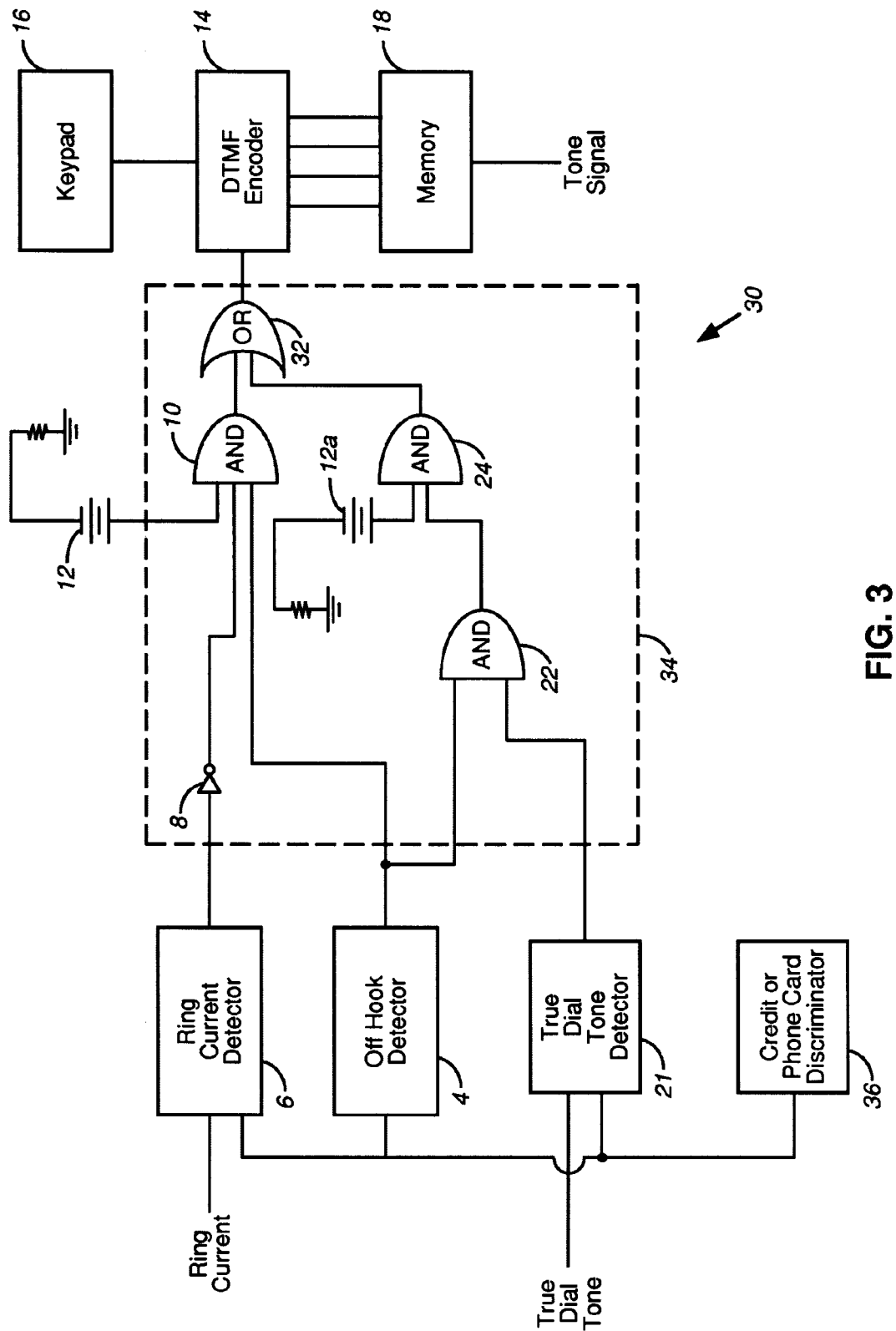
FIG. 3 is a flow chart illustrating the scenario where a user receives a call when there is no data connection between the inventive module and a communications network.

FIG. 3 illustrates the scenario whereby the user receives a call over the analog POTS when there is no data connection between module 2 and PSTN 18. For the FIG. 3 scenario, the outside communications network would signal module 2 that there is an incoming call, per step 62. In receipt of the incoming call signal, module 2, by means of ring generator 28, generates the appropriate ring for activating the user's telephone for apprizing the user that there is an incoming call, per step 64. The user then picks up the telephone per step 66. At which time, module 2 completes the call with PSTN 18, per step 68. In this instance, if module 2 is deactivated due to a lack of power, the incoming call is directly routed through network access unit 16 to telephone interface unit 10 by means of patch through line 60, so that the user could directly answer the call as if module 2 is not present.

Figure 4:
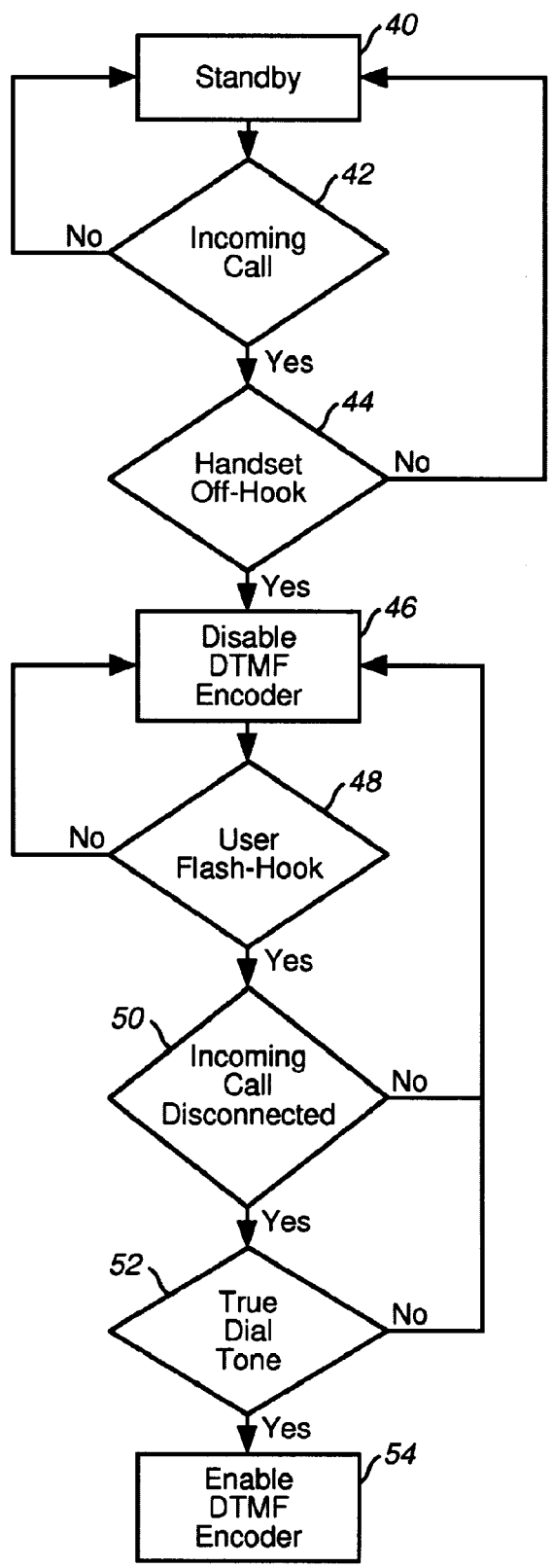
FIG. 4 is a flow chart illustrating how the invention module establishes data connection with a communications network.

FIG. 4 illustrates the scenario whereby module 2 establishes a data connection with the outside communications network. In particular, module 2 first assigns an IP address to the IP device, be it PC 14 or any other computerized appliance connected to module 2, on boot up, per step 70. If PC 14 then requests a data communication, module 2 would request such external IP connection, per step 72. In step 74, module 2 may optionally send call forwarding DTMF signals to the switch of PSTN 18. In any event, module 2 next initiates a dial up connection to the internet service provider to whom the user is a subscriber of, per step 76. An IP address is received from the ISP by module 2, per step 78. At which time, module 2 informs voice over IP gateway 36 its new IP address, as assigned thereto by the ISP, and requests a mapping E.164 number to the IP address, per step 80. What this process does is to route calls made to that E.164 number to the IP address using the voice over IP gateway 36. Thereafter, at step 82, module 2 routes all IP traffic and performs network address translation for the data traversing between the outside communications network and its PC 14.

Figure 5:
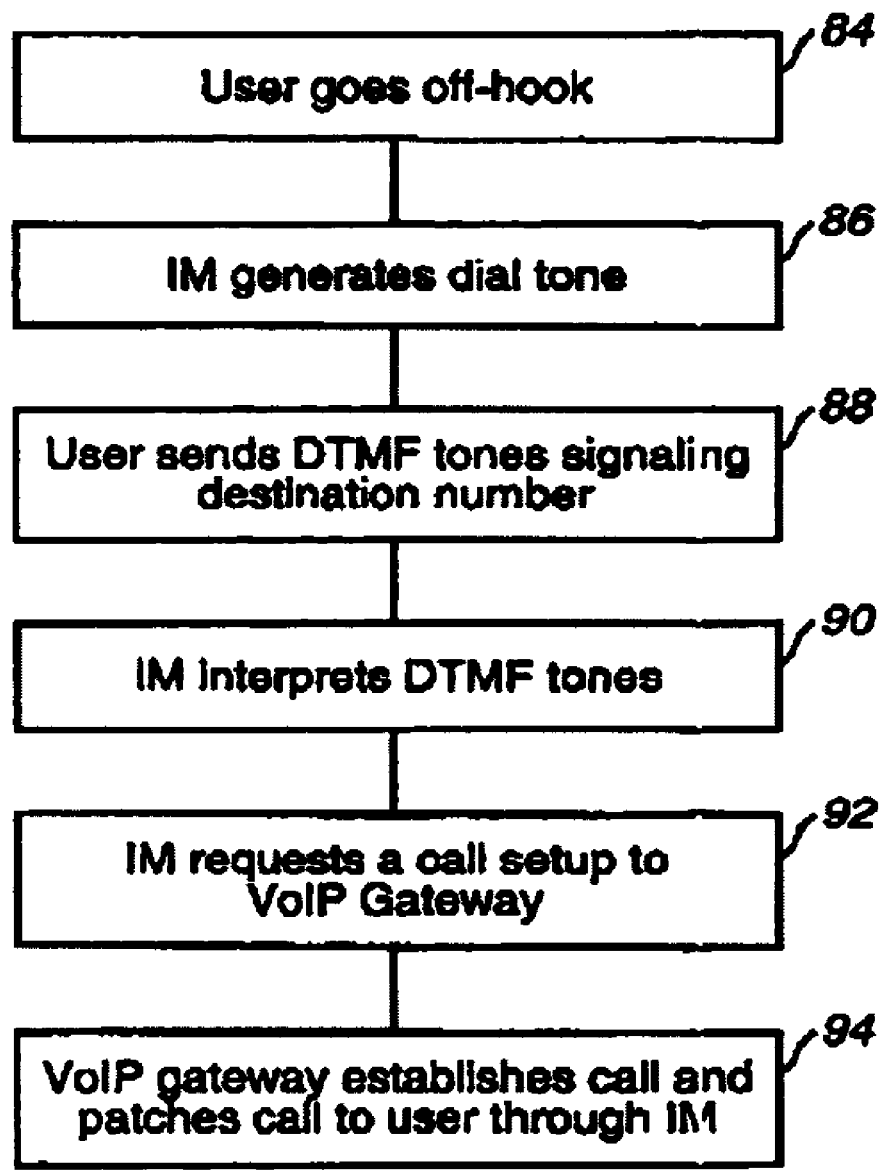
FIG. 5 is a flow chart illustration of the invention module initiating a call when there is a data connection between the invention module and a communications network.

The FIG. 5 scenario illustrates what happens when a voice call is placed over a data communication. As shown, per step 84, the user goes off hook. At that point, dial tone generator 32 within module 2 generates a dial tone, per step 86. In hearing the dial tone, the user presses the appropriate keys of the keypad of his telephone to generate the DTMF tones that signal the destination number that he dialed, per step 88. The DTMF tones input by the user are then interpreted by the DTMF decoder 30 per step 90. Once decoded, module 2 requests a call setup to voice over IP gateway 36 per step 92. Voice over IP gateway subsequently establishes the call and patches the call to PSTN 18 and then back to the user, per step 94.

Figure 6:
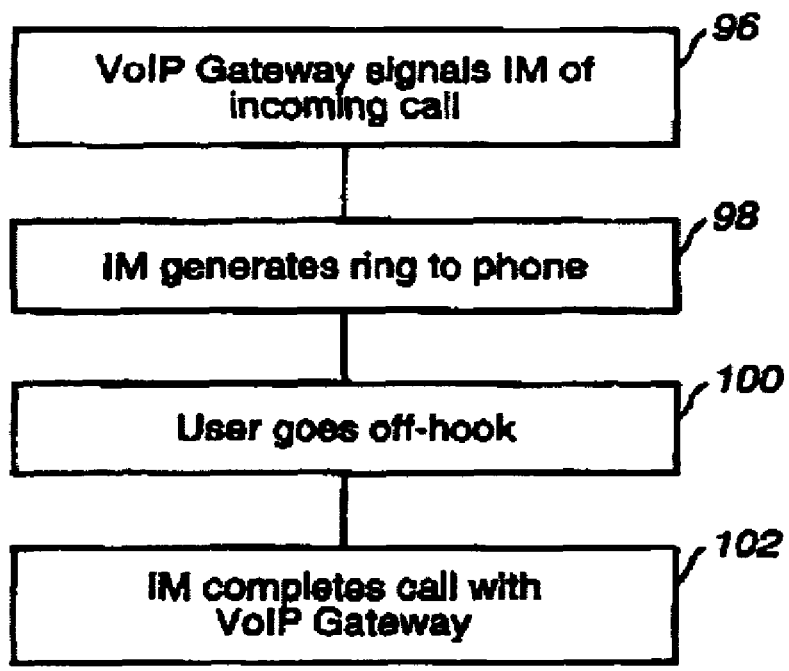
FIG. 6 is a flow chart illustrating a scenario where the invention module receives a telephone call while it is in connection with a communications network.

FIG. 6 illustrates the scenario whereby a call is received over data connection. In this scenario, voice over IP gateway 36 signals module 2 of an incoming call, per step 96. A ring signal is then generated by ring generator 28 and output to the user's telephone, per step 98. In hearing the ring, the user picks up the telephone and therefore goes off hook, per step 100. Module 2 then completes the call with the voice over IP gateway 36, per step 102.

Figure 7:
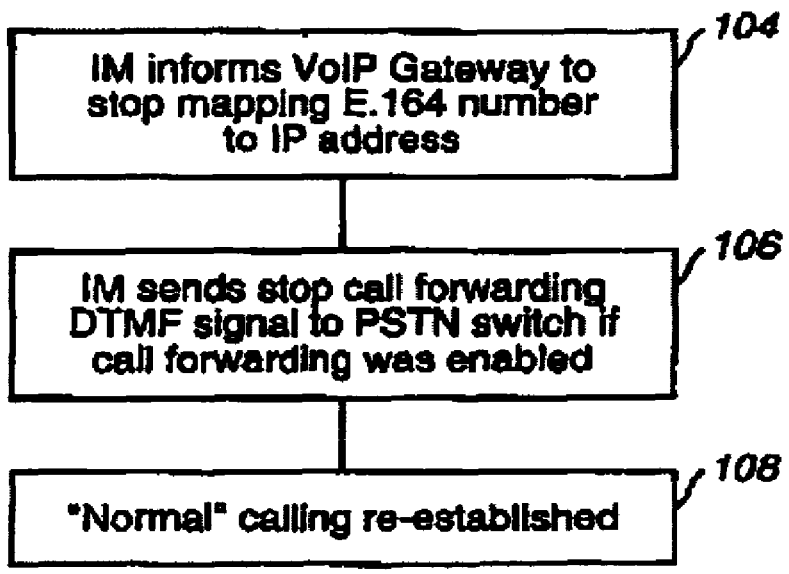
FIG. 7 is a flow chart outlining how the invention module terminates its data connection with the communications network and restores conventional telephone calling for the user.
Figure 1:
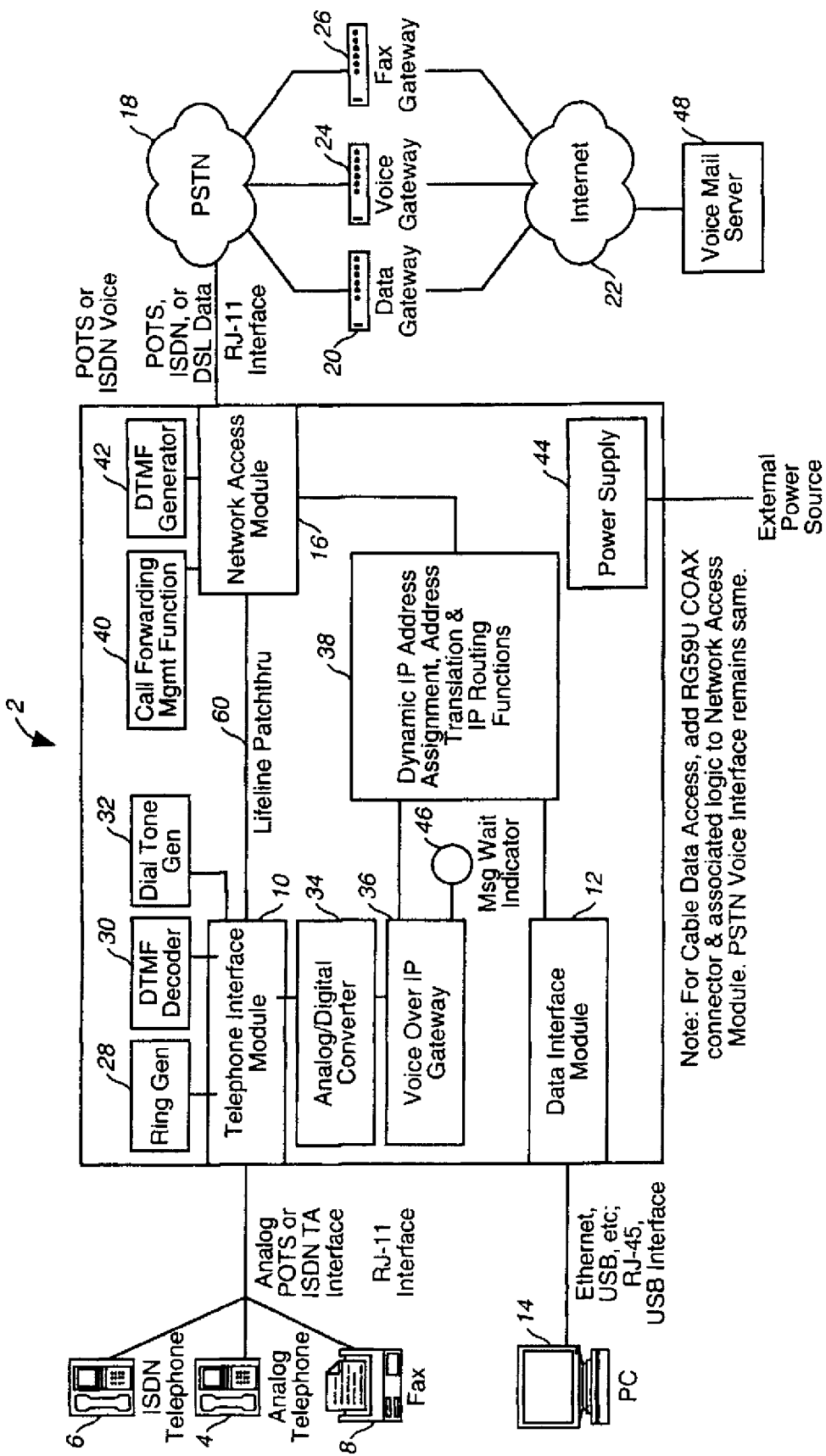
Figure 2:
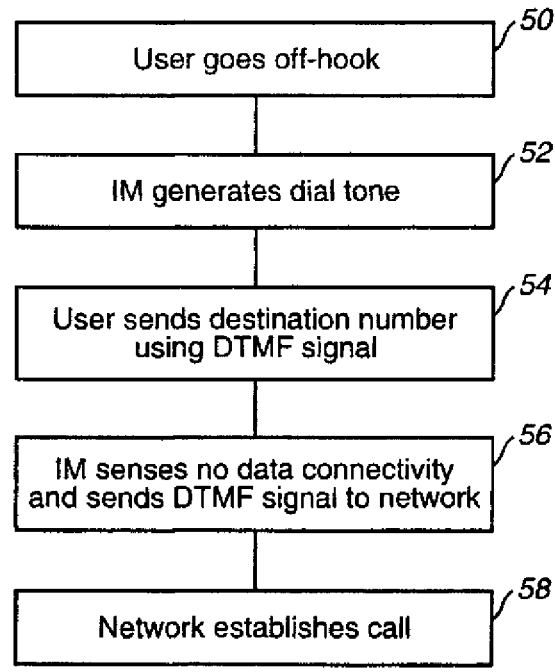
Figure 3:
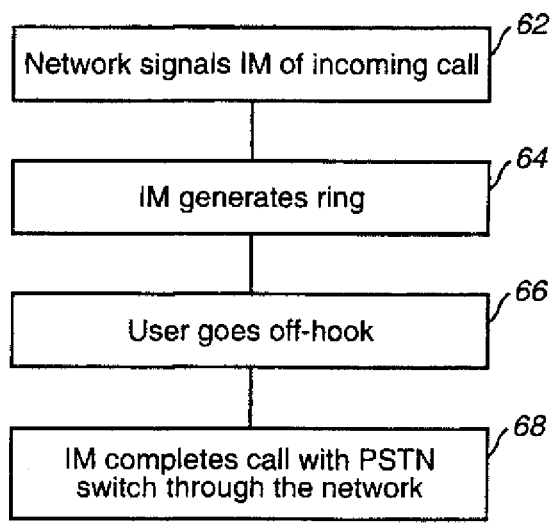
Figure 4:
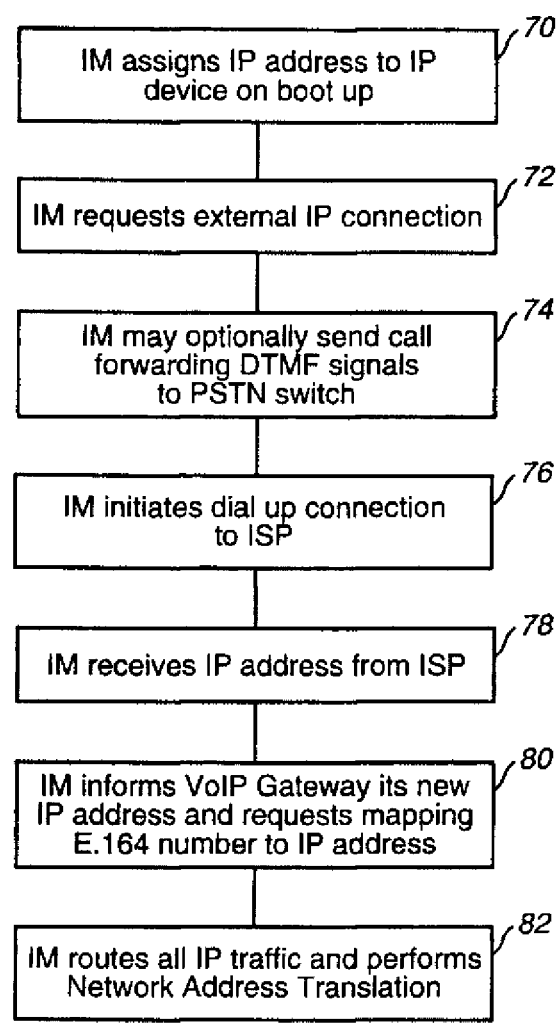
Figure 5:
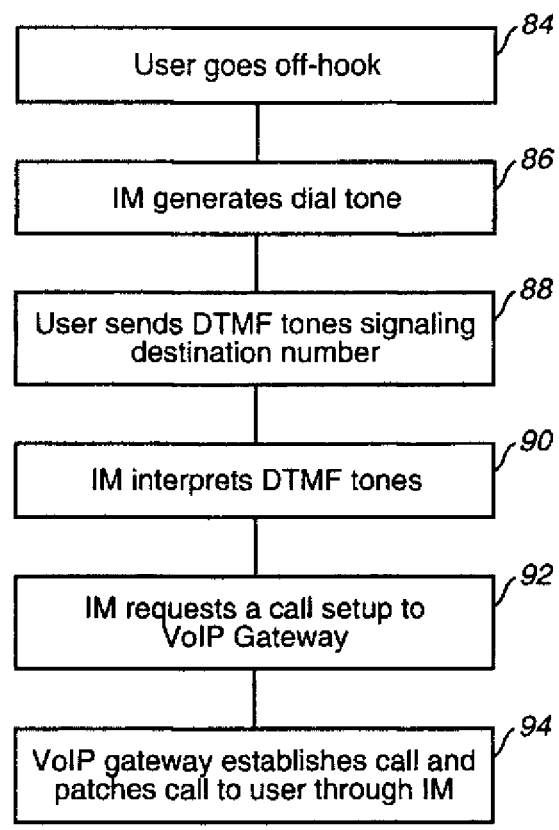
Figure 6:
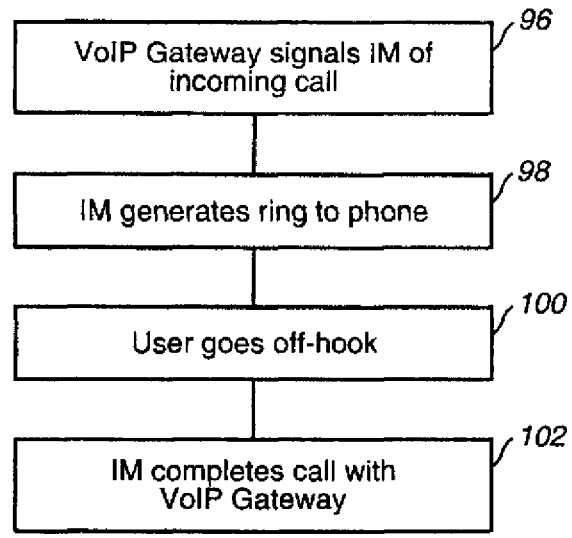
Figure 7:
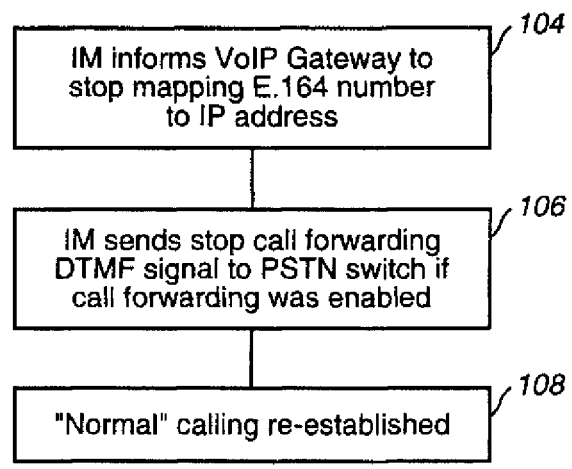
Figure 1:
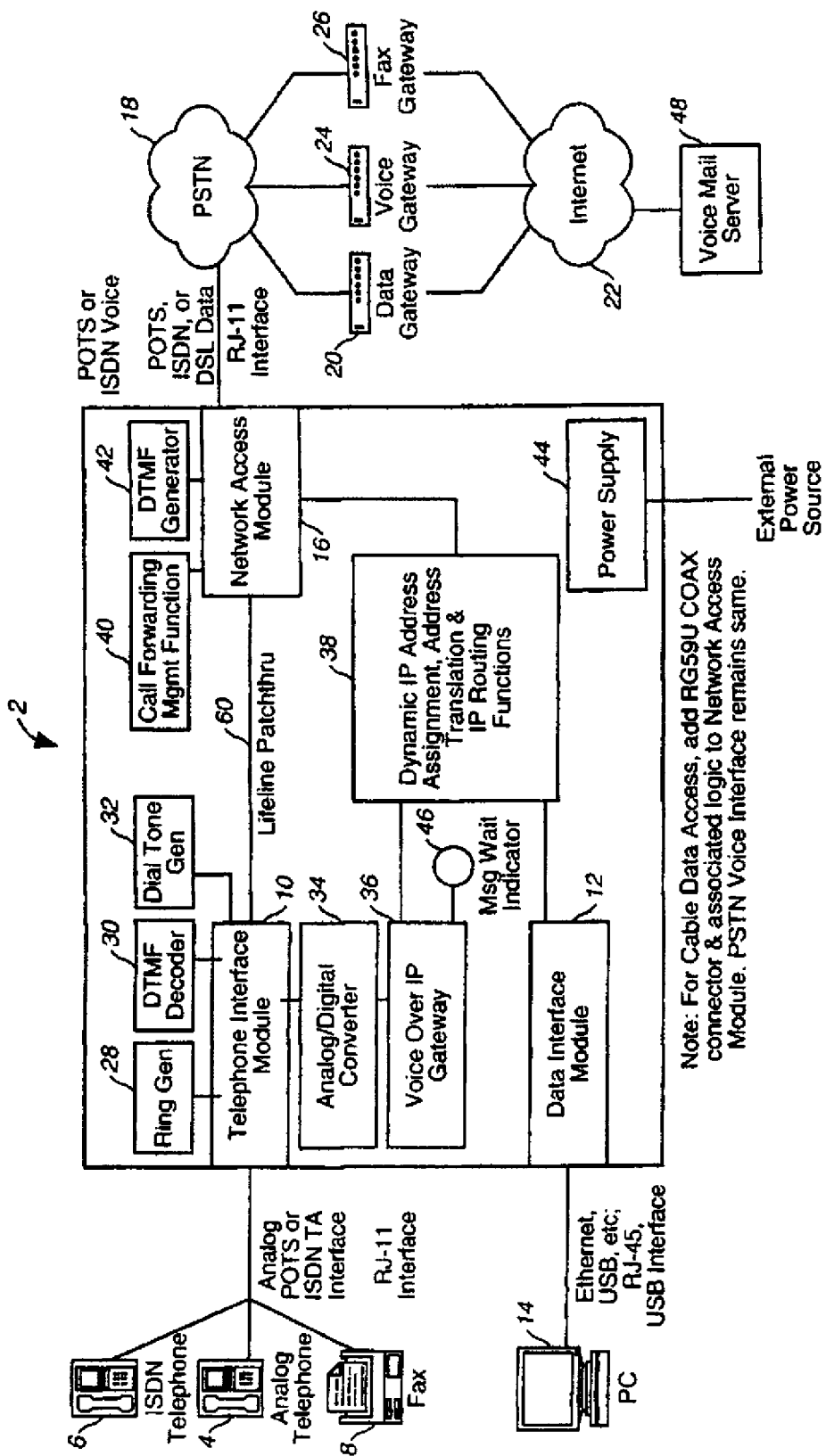
Figure 2:
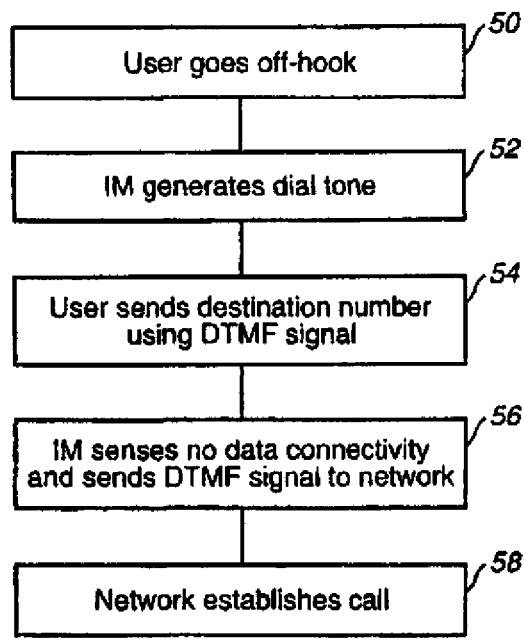
Figure 3:
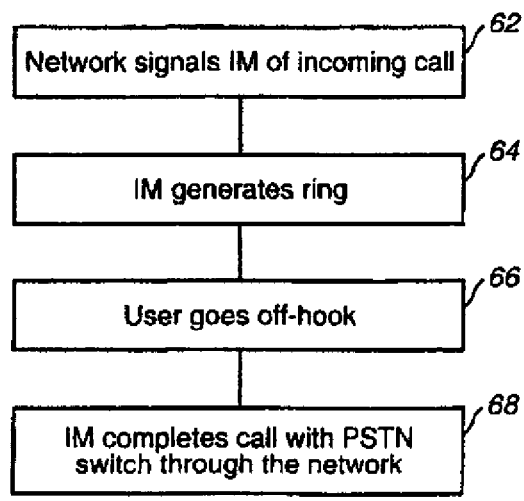
Figure 4:
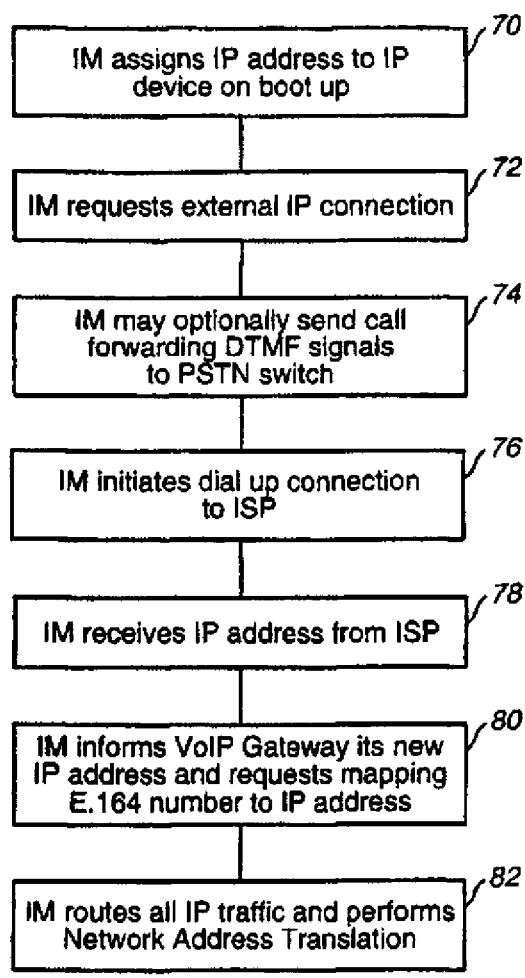
Figure 5:
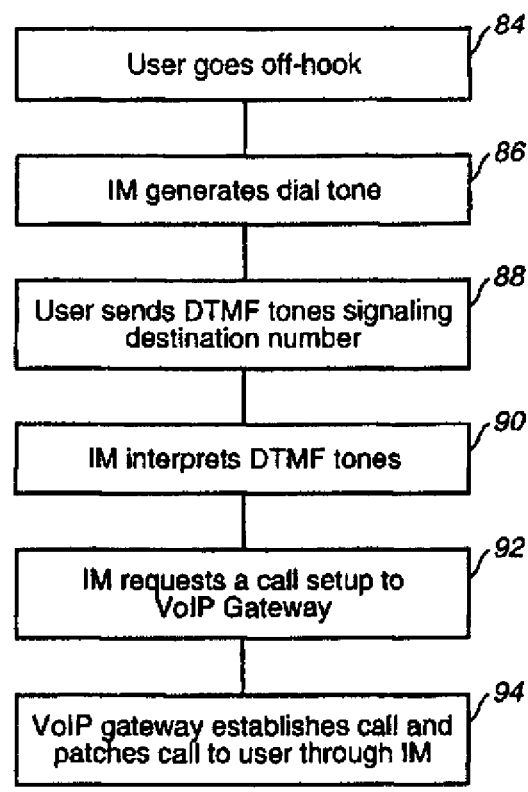
Figure 6:
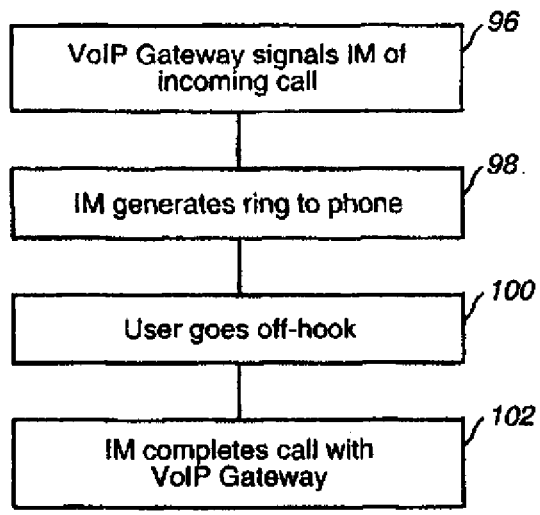
Figure 7:
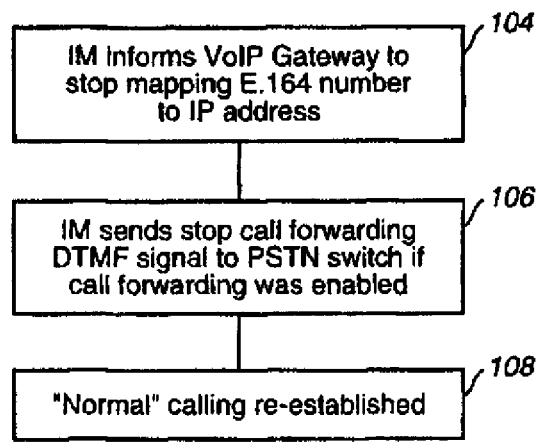

FIG. 7 illustrates the scenario where the data connection has ended and any call made between the caller and PSTN 18 is akin to any "normal" call. In this scenario, module 2, upon sensing that the data connection has ended, informs voice over IP gateway 36 to stop mapping E.164 number to IP address, per step 104. Accordingly, calls made to the E.164 number will stop being routed to the previously assigned IP address. Instead, such calls will be terminated directly via the switch at PSTN 18. Next, module 2 sends stop call forwarding DTMF signals to the PSTN switch, if the call forwarding option has been enabled, per step 106. Thereafter, "normal" calling is reestablished per step 108.

By thus assigning pseudo IP addresses to the various user devices connected thereto, module 2 of the instant invention is able to connect each of those devices to an external communications network by using only one single external connection. Thus, both voice and data communications could be effected at the same time by using the same telephone line that connects the user to the external communications network.

Inasmuch as the present invention is subject to many variations, modifications and changes in detail, it is intended that all matter described throughout this specification and shown in the accompanying drawings be interpreted as illustrative only and not in a limiting sense. Accordingly, it is intended that the invention be limited only by the spirit and scope of hereto appended claims.

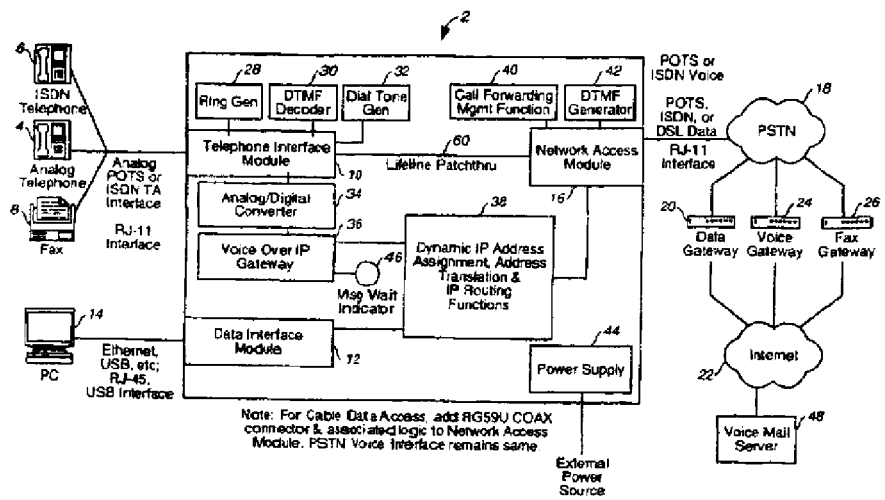

What is claimed is:

1. Apparatus for enabling more than one communicative process to be carried on at the same time over a subscriber line, comprising:
    a network interface means for connecting to a circuit switched telephone network;
    a telephone interface means for connecting to at least one telephone, wherein the telephone interface means is adapted to patch a call from the one telephone to the circuit switched telephone network via the network interface means upon a determination that no data connection is established to the circuit switched telephone network;
    a computer interface means for connecting to at least one computer; and
    a routing means for assigning internal network addresses to said telephone and said computer, and selectively routing voice and data signals from said telephone and said computer to and from said circuit switched telephone network via said subscriber line based on said assigned internal network addresses.

2. Apparatus of claim 1, further comprising:
    a gateway means for packetizing voice signals received from said telephone interface and depacketizing voice signals from said routing means, packetized signals being routed by said routing means for transmission to the circuit switched telephone network and depacketized voice signals being routed to said telephone interface for establishing a telephone conversation between a caller using said telephone and an other caller connected to the circuit switched telephone network via another telephone.

3. Apparatus of claim 1, wherein said routing means includes an address conversion and translation means for translating the respective internal network addresses of said telephone and computer to correspond with an external network address of said subscriber line assigned to communicate with the circuit switched telephone network.

4. Apparatus of claim 1, further comprising:
    a packet prioritization module for setting respective priorities for voice and data signals.

5. Apparatus of claim 4, wherein said packet prioritization module further prioritizes voice signals over data signals so that voice signals take precedent over data signals when both voice and data signals are being communicated between said apparatus and the circuit switched telephone network using said subscriber line.

6. Apparatus of claim 1, wherein said routing means apportions the bandwidth of said subscriber line for selectively routing the voice signals and data signals between said telephone and computer, respectively, and the circuit switched telephone network.

7. Apparatus of claim 1, further comprising:
    a dual tone multi-frequency (DTMF) generator;
    a call forward management module working cooperatively with said network interface means for forwarding a call to either said telephone or said computer; and
    a message waiting light for informing a user that a voice call has been received and forwarded by said call forward management module to said telephone.

8. Apparatus of claim 1, further comprising:
    a voice circuit for receiving and converting data routed from said routing means to said telephone, and for converting and feeding voice signals input from said telephone to said routing means.

9. Apparatus of claim 8, wherein said voice circuit comprises:
    an analog to digital converter for converting voice signals from said telephone into digital signals for routing to a gateway that packetizes said digital signals;
    a digital to analog converter for converting digital signals depacketized by said gateway into voice signals to be routed to said telephone;
    a ring generator for ringing said telephone when a voice signal is received at said gateway;
    a dual tone multi-frequency (DTMF) generator for generating an address whereto a voice signal from said telephone is to be routed; and
    a dial tone generator for generating a dial tone for said telephone when said telephone is taken off hook.

10. Apparatus of claim 2, wherein the gateway means is configured to map a telephone number compatible with the circuit switched telephone network to one of the internal network addresses.

11. A communications controller to be used at a site to connect to a circuit switched telephone network, said site including at least one telephone and one computer both adaptable to be accessible to the circuit switched telephone network, said communications controller comprising:
    a network interface means for effecting a connection with the circuit switched telephone network via a subscriber line;
    a telephone interface means for establishing a connection with said telephone, wherein the telephone interface means is adapted to passively patch a call from said telephone to the circuit switched telephone network via the network interface means;
    a computer interface means for establishing a connection with said computer; and
    a routing means communicatively connected to the circuit switched telephone network, telephone and computer interface means for assigning internal network addresses to said telephone and said computer, and for selectively routing voice signals and data signals among said telephone and computer and the circuit switched telephone network, so that both voice and data signals are communicated between said site and the circuit switched telephone network using said subscriber line based on said internal network addresses.

12. Communications controller of claim 11, wherein said routing means includes an address conversion and translation means for assigning said internal network addresses for said telephone and computer, and correlating said internal network addresses with an external network address of said subscriber line assigned by the circuit switched telephone network; and
    wherein said routing means selectively routes the voice and data signals between said telephone and computer, respectively, and the circuit switched telephone network by establishing respective connections between said external network address of said subscriber line and said internal network addresses of said telephone and said computer so that both voice and data signals can be exchanged between said telephone and said computer connected to said communications controller and devices communicatively connected to the circuit switched telephone network.

13. Communications controller of claim 11, further comprising:
a voice circuit communicatively connected to said telephone and said routing means for receiving and converting digital voice signals routed from said routing means into analog voice signals for said telephone, and converting and feeding analog voice signals input from said telephone into digital voice signals for said routing means.

14. Communications controller of claim 11, wherein said voice circuit comprises:
an analog to digital converter for converting voice signals from said telephone into digital signals for routing to a gateway that packetizes said digital signals;
a digital to analog converter for converting digital signals depacketized by said gateway into voice signals to be routed to said telephone;
a ring generator for ringing said telephone when a voice signal is received at said gateway;
a dual tone multi-frequency (DTMF) generator; and
a dial tone generator for generating dial tone for said telephone when said telephone is taken off hook.

15. Communications controller of claim 11, further comprising:
a gateway means for packetizing voice signals received from said telephone interface means and depacketizing voice signals received from said routing means, packetized voice signals being routed by said routing means for transmission to the circuit switched telephone network and depacketized voice signals being routed to said telephone interface means for establishing a telephone connection between a caller using said telephone and an other caller connected to the circuit switched telephone network via another telephone.

16. Communications controller of claim 11, wherein said routing means includes an address conversion and translation means for translating the respective internal network addresses of said telephone and computer to correspond with an external network address of said subscriber line assigned to communicate with the circuit switched telephone network.

17. Communications controller of claim 11, wherein said routing means apportions the bandwidth of said subscriber line for selectively routing the voice signals and data signals between said telephone and computer, respectively, and the circuit switched telephone network.

18. Communications controller of claim 15, further comprising:
a packet prioritization module for setting respective priorities for voice and data signals, said packet prioritization module prioritizing voice signals over data signals so that voice signals take precedent over data signals when both voice and data signals are being communicated between said site and the circuit switched telephone network using said subscriber line.

19. Communication of claim 15, wherein the gateway means is configured to map a telephone number compatible with the circuit switched telephone network to one of the internal network addresses.

20. A method of utilizing a subscriber line at a site to provide voice and data communication with a circuit switched telephone network, comprising the steps of:
connecting said subscriber line to a network interface for effecting a connection with the circuit switched telephone network;
connecting a telephone to a telephone interface for establishing a connection with said telephone;
determining whether a data connection is established with the circuit switched telephone network;
patching a call initiated from the telephone to the circuit switched telephone network via the network interface means based upon the determining step;
connecting a computer to a computer interface for establishing a connection with said computer; and
communicatively connecting a routing means to the circuit switched telephone network, telephone and computer interfaces for assigning internal network addresses to said telephone and said computer, and for selectively routing voice signals and data signals among said telephone and computer and the circuit switched telephone network, so that both voice and data signals are communicated between said site and the circuit switched telephone network using said subscriber line based on said assigned internal network addresses.

21. Method of claim 20, wherein said routing means apportions the bandwidth of said subscriber line for selectively routing the voice signals and data signals.

22. Method of claim 20, wherein said communicatively connecting step further comprises the step of:
prioritizing voice signals over data signals so that voice signals take precedent over data signals when both voice and data signals are being communicated between said site and the circuit switched telephone network using said subscriber line.

23. Method of claim 20, further comprising the steps of:
correlating said internal network addresses with an external network address of said subscriber line assigned by the circuit switched telephone network; and
establishing respective connections between said external network address of said subscriber line and said internal network addresses of said telephone and computer for selectively routing the voice and data signals between said telephone and computer, respectively, and the circuit switched telephone network to thereby exchange both voice and data signals between said telephone and said computer and devices communicatively connected to the circuit switched telephone network.

24. Method of claim 20, further comprising the step of:
communicatively connecting a voice circuit to said telephone and said routing means for receiving and converting digital voice signals routed from said routing means into analog voice signals for said telephone, and converting and forwarding analog voice signals output from said telephone into digital voice signals for said routing means.

25. Method of claim 20, further comprising the steps of:
converting analog voice signals from said telephone into digital voice signals for routing to a gateway that packetizes said digital voice signals;
converting digital voice signals depacketized by said gateway to analog voice signals to be routed to said telephone;
ringing said telephone when a voice signal is received at said gateway; and
generating a dial tone for said telephone when said telephone is taken off hook.

26. Method of claim 20, further comprising the step of:
packetizing voice signals received from said telephone interface and depacketizing voice signals from said routing means, packetized signals being routed by said routing means for transmission to said circuit switched telephone network and depacketized voice signals being routed to said telephone interface for establishing a telephone connection between a caller using said telephone and another caller connected to said circuit switched telephone network via another telephone.

27. Method of claim 20, further comprising:
mapping a telephone number compatible with the circuit switched telephone network to one of the internal network addresses.

28. A communications device configured to communicate with a circuit switched telephone network over a subscriber line, comprising:
- a plurality of interfaces respectively configured to communicate with a telephone, a computer, and the circuit switched telephone network over the subscriber line; and
- logic configured to assign respective internal network addresses for the telephone and the computer, translate between the respective internal network addresses and an external network address assigned to the subscriber line, and route voice and data signals among the telephone and the computer and the circuit switched telephone network over the subscriber line based on the assigned internal network addresses and the external network address assigned to the subscriber line, wherein the plurality of interfaces support patching a call from the telephone to the circuit switched telephone network upon a determination that no data connection is established to the circuit switched telephone network.

29. A method for communicating with a circuit switched telephone network over a subscriber line using a communications device, the method comprising:
- determining whether a data connection is established with the circuit switched telephone network;
- patching a call initiated from a telephone to the circuit switched telephone network based upon the determining step;
- assigning respective internal network addresses for the telephone and a computer;
- translating between the respective internal network addresses and an external network address assigned to the subscriber line; and
- routing voice and data signals between the telephone and the computer and the circuit switched telephone network over the subscriber line based on the assigned internal network addresses and the external network address assigned to the subscriber line.

* * * * *

UNITED STATES PATENT AND TRADEMARK OFFICE
CERTIFICATE OF CORRECTION

PATENT NO. : 7,110,390 B1
APPLICATION NO. : 09/294475
DATED : September 19, 2006
INVENTOR(S) : Gatesman et al.

It is certified that error appears in the above-identified patent and that said Letters Patent is hereby corrected as shown below:

On Title Page, Item (75) Inventor:, after "Kevin Gatesman, Fairfax, VA (US)", please add --, Vatsal Sonecha, Herndon, VA (US)--.

Signed and Sealed this

Nineteenth Day of December, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,110,390 B1 | Page 1 of 6 |
| APPLICATION NO. | : 09/294475 | |
| DATED | : September 19, 2006 | |
| INVENTOR(S) | : Kevin Gatesman et al. | |

It is certified that error appears in the above-identified patent and that said Letters Patent is hereby corrected as shown below:

In the drawings, delete Figures 1-4 and replace them with enclosed Figures 1-7.

Signed and Sealed this

Fourteenth Day of August, 2012

David J. Kappos
*Director of the United States Patent and Trademark Office*

UNITED STATES PATENT AND TRADEMARK OFFICE
CERTIFICATE OF CORRECTION

PATENT NO. : 7,110,390 B1
APPLICATION NO. : 09/294475
DATED : September 19, 2006
INVENTOR(S) : Kevin Gatesman et al.

It is certified that error appears in the above-identified patent and that said Letters Patent is hereby corrected as shown below:

Delete the title page and substitute therefore the attached title page consisting of the corrected illustrative figure and number of drawing sheets in patent.

Delete Drawing Sheets 1-6 and substitute therefore the attached Drawing Sheets 1-5. FIGS. 1-4 have been substituted with replacement FIGS. 1-4.

This certificate supersedes the Certificate of Correction issued August 14, 2012.

Signed and Sealed this
Fourth Day of September, 2012

David J. Kappos
*Director of the United States Patent and Trademark Office*

(12) United States Patent
Gatesman

(10) Patent No.: US 7,110,390 B1
(45) Date of Patent: Sep. 19, 2006

(54) COMMUNICATION CONTROLLER FOR PROVIDING MULTIPLE ACCESS USING A SINGLE TELEPHONE LINE

(75) Inventor: Kevin Gatesman, Fairfax, VA (US)

(73) Assignee: MCI, Inc., Ashburn, VA (US)

( * ) Notice: Subject to any disclaimer, the term of this patent is extended or adjusted under 35 U.S.C. 154(b) by 546 days.

(21) Appl. No.: 09/294,475

(22) Filed: Apr. 20, 1999

(51) Int. Cl.
  *H04L 12/66* (2006.01)
  *H04L 12/28* (2006.01)

(52) U.S. Cl. .................. 370/352; 370/401; 370/466

(58) Field of Classification Search ........ 370/351–356, 370/400–402, 473–466; 379/88.17, 900, 379/215.01; 709/265
See application file for complete search history.

(56) References Cited

U.S. PATENT DOCUMENTS

| | | | |
|---|---|---|---|
| 5,793,763 A * | 8/1998 | Mayes et al. | 370/401 |
| 5,946,384 A * | 8/1999 | Yee et al. | 379/215.01 |
| 6,028,848 A | 2/2000 | Bhatia et al. | |
| 6,058,431 A * | 5/2000 | Srisuresh et al. | 709/245 |
| 6,067,353 A * | 5/2000 | Szeliga | 379/215.01 |
| 6,108,330 A * | 8/2000 | Bhatia et al. | 370/352 |
| 6,295,293 B1 * | 9/2001 | Tonnby et al. | 370/351 |
| 6,320,857 B1 * | 11/2001 | Tonnby et al. | 370/352 |
| 6,353,614 B1 * | 3/2002 | Borella et al. | 370/401 |
| 6,385,194 B1 * | 5/2002 | Surprenant et al. | 370/353 |
| 6,449,251 B1 * | 9/2002 | Awadallah et al. | 370/465 |
| 6,452,923 B1 * | 9/2002 | Gerszberg et al. | 370/352 |
| 6,456,625 B1 * | 9/2002 | Itoi | 370/401 |
| 6,515,996 B1 * | 2/2003 | Tonnby | 370/352 |

FOREIGN PATENT DOCUMENTS

| | | |
|---|---|---|
| WO | 97/46073 | * 12/1997 |
| WO | 97/47127 | * 12/1997 |
| WO | 98/37665 | 8/1998 |

OTHER PUBLICATIONS

Hansson et al., "Phone Doubler – A Step Towards Integrated Internet and Telephone Communities", On—Ericsson Review, Ericsson, Stockholm, SE, No. 4, 1997, pp. 142-151.

* cited by examiner

Primary Examiner—Steven Nguyen

(57) ABSTRACT

Instead of having to subscribe to multiple telephone lines for multiple devices that a user has, a module of the present invention can connect each of the user's devices to an outside communications network using the same telephone line. Such multiple inside connections to the outside communication network using the same telephone line is achieved by provisioning within the invention module the appropriate telephone and computer interface units for the user's telephones and computers, and an appropriate network interface unit for connection to the telephone line that connects the invention module to the external communications network. The module of the instant invention is further provisioned with an IP routing submodule that communicatively connects the various interface units together by managing the addressing of the data that traverses between the outside network and the devices of the user, by routing the appropriate data packets to the appropriate devices by means of pseudo internal IP addresses assigned to the various devices of the user. Other components within the module convert those data packets that are a part of a voice signal into the appropriate analog signal for output to the telephone of the user. Conversely, such components convert any analog input from the user into a corresponding digital signal that is packetized and output to the external communications network.

29 Claims, 5 Drawing Sheets